United States Patent
Xiao et al.

(10) Patent No.: US 8,588,702 B2
(45) Date of Patent: Nov. 19, 2013

(54) METHOD, EQUIPMENT FOR SUBMITTING A MEASUREMENT REPORT

(75) Inventors: Dengkun Xiao, Beijing (CN); Yuan He, Beijing (CN); Jing Han, Beijing (CN); YuHong Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 146 days.

(21) Appl. No.: 13/101,395

(22) Filed: May 5, 2011

(65) Prior Publication Data

US 2011/0312281 A1 Dec. 22, 2011

Related U.S. Application Data

(63) Continuation of application No. PCT/CN2009/074840, filed on Nov. 6, 2009.

(30) Foreign Application Priority Data

Nov. 6, 2008 (CN) .......................... 2008 1 0173572

(51) Int. Cl.
*H04B 17/00* (2006.01)
*H04W 36/00* (2009.01)
*H04W 4/00* (2009.01)
*H04B 3/46* (2006.01)
*H04Q 1/20* (2006.01)

(52) U.S. Cl.
USPC ......... 455/67.11; 455/444; 370/332; 375/224

(58) Field of Classification Search
USPC ................ 455/443, 444, 522, 67.11, 115.1; 370/318, 332; 375/224
See application file for complete search history.

(56) References Cited

U.S. PATENT DOCUMENTS

2005/0265222 A1* 12/2005 Gerlach ......................... 370/208
2005/0272433 A1* 12/2005 Won et al. ..................... 455/449
2008/0057996 A1   3/2008 Sung et al.

(Continued)

FOREIGN PATENT DOCUMENTS

CN    1770908 A    5/2006
CN  101047938 A   10/2007

(Continued)

OTHER PUBLICATIONS

S-E Elayoubi et al., "On frequency allocation 3G LTE systems", IEEE PIMRC 2006, Sep. 2006, pp. 1-5.

(Continued)

*Primary Examiner* — Andrew Wendell
(74) *Attorney, Agent, or Firm* — Staas & Halsey LLP

(57) ABSTRACT

A method, relevant equipment and system for determining a User Equipment (UE) or UEs affecting a neighboring cell are disclosed. The method for determining UE or UEs affecting a neighboring cell includes: receiving load information sent by a neighboring cell, where the load information indicates an interfered Physical Resource Block (PRB) of the neighboring cell; determining a UE or UEs that occupy, when scheduling is performed, the interfered PRB; determining UEs located in an Inter-Cell Interference Coordination (ICIC) measurement area corresponding to the neighboring cell; and obtaining an intersection of the UE or UEs that occupy, when scheduling is performed, the interfered PRB and the UE or UEs located in the ICIC measurement area corresponding to the neighboring cell. The technical solution under the present invention enables accurate determining of the UE or UEs that affect the neighboring cell.

8 Claims, 9 Drawing Sheets

(56) References Cited

U.S. PATENT DOCUMENTS

| | | | |
|---|---|---|---|
| 2008/0108358 A1 | 5/2008 | Patel et al. | |
| 2009/0141662 A1* | 6/2009 | Gurney et al. | 370/311 |
| 2009/0279519 A1* | 11/2009 | Brisebois et al. | 370/338 |
| 2010/0020852 A1* | 1/2010 | Erell et al. | 375/141 |
| 2010/0105395 A1 | 4/2010 | Ji et al. | |
| 2011/0312281 A1 | 12/2011 | Xiao et al. | |
| 2013/0121198 A1* | 5/2013 | Xiao et al. | 370/252 |

FOREIGN PATENT DOCUMENTS

| | | | |
|---|---|---|---|
| CN | 101052192 A | 10/2007 | |
| CN | 101137237 A | 3/2008 | |
| CN | 101207890 A | 6/2008 | |
| CN | 101248694 A | 8/2008 | |
| CN | 101248694 A | 8/2008 | |
| WO | 2007/109939 A1 | 10/2007 | |
| WO | 2008/022887 A1 | 2/2008 | |

OTHER PUBLICATIONS

Salah Eddine Elayoubi et al., "Uplink Intercell Interference and Capacity in 3G LTE systems", ICON 2007, pp. 537-541.

Che-Sheng Chiu et al., "Improving Inter-Sector Handover User Throughput by Using Partial Reuse and Softer Handover in 3GPP LTE Downlink", ICACT 2008, pp. 463-467.

S-E Elayoubi et al., "Performance Evaluation of Frequency Planning Schemes in OFDMA-based Networks", IEEE Transactions on Wireless Communications, vol. 7, No. 5, May 2008, pp. 1623-1633.

"Necessary RSRP Information for UL and DL ICIC to be provided by Layer 2", 3GPP TSG RAN WG1 Meeting #54, Aug. 2008, pp. 1- 5.

3GPP TS 36.423 V10.5.0, "$3^{rd}$ Generations Partnership Project; Technical Specification Group Radio Access Network; Evolved Universal Terrestrial Radio Access Network (E-UTRAN); X2 application protocol (X2AP)", Release 10, Mar. 2010, pp. 1-132.

Written Opinion of the International Searching Authority mailed Feb. 25, 2010 issued in corresponding International Patent Application No. PCT/CN2009/074840.

International Search Report issued Feb. 25, 2010 in corresponding International Patent Application No. PCT/CN2009/074840.

International Search Report, mailed Feb. 25, 2010, in corresponding International Application No. PCT/CN2009/074840 (6 pp.).

Office Action, dated May 2, 2013, in corresponding U.S. Appl. No. 13/729,125950 (19 pp.).

Final Office Action mailed Sep. 6, 2013 in co-pending child U.S. Appl. No. 13/729,950 (10 pages).

U.S. Appl. No. 13/729,950, filed Dec. 28, 2012, Xiao et al., Huawei Technologies Co., Ltd.

Chinese First Office Action mailed Jun. 20, 2013 in corresponding Chinese Patent Application No. 201210296784.8 (6 pages) (6 pages English Translation).

* cited by examiner

METHOD, EQUIPMENT FOR SUBMITTING A MEASUREMENT REPORT

CROSS-REFERENCE TO RELATED APPLICATIONS

This application is a continuation of International Application No. PCT/CN2009/074840, filed on Nov. 6, 2009, which claims priority to Chinese Patent Application No. 200810173572.4, filed on Nov. 6, 2008, both of which are hereby incorporated by reference in their entireties.

FIELD OF THE INVENTION

The present invention relates to the field of communication technologies, and in particular, to a method and equipment for submitting or receiving a measurement report.

BACKGROUND OF THE INVENTION

A key step in an Inter-Cell Interference Coordination (ICIC) method is to find the UEs that affect neighboring cells. In the prior art, when a UE is located in an ICIC measurement area, the serving cell receives a Reference Signal Received Power (RSRP) measurement value reported by the UE, where the measurement value is obtained by measuring a neighboring cell, and the serving cell determines the UE affecting the neighboring cell according to the RSRP measurement values reported by multiple UEs.

For example, the locations of UE A and UE B are as shown in FIG. 1. Although UE B is farther away from the neighboring cell than UE A, the radio channel transmission environment of UE B is better than that of UE A. Therefore, the RSRP measurement value reported by UE A may be the same as that reported by UE B, and the NodeB of the serving cell is unable to determine, according to the RSRP measurement value, which UE affects the neighboring cell.

SUMMARY OF THE INVENTION

A method and equipment for submitting or receiving a measurement report are provided in embodiments of the present invention.

The following technical solution is put forward:

A method and a UE for submitting a measurement report are provided in an embodiment of the present invention to report measurement parameters in a multi-band system.

The following technical solution is put forward:

A method for submitting a measurement report includes:
measuring multiple carriers of a neighboring cell, and obtaining measurement parameters of the corresponding carriers; and
sending a measurement report to a serving cell NodeB, where the measurement report includes the obtained measurement parameters and carrier indications indicating carriers corresponding to the obtained measurement parameters.

A UE includes:
a measurement parameter obtaining unit, configured to measure multiple carriers of a neighboring cell, and obtain measurement parameters of the corresponding carriers; and
a measurement report sending unit, configured to send a measurement report to a serving cell NodeB, where the measurement report includes the measurement parameters obtained by the measurement parameter obtaining unit and carrier indications indicating carriers corresponding to the obtained measurement parameters.

In the preceding embodiment, measurement parameters of multiple carriers are obtained, and the measurement parameters and the corresponding carrier indications are reported. In this way, the measurement parameters of multiple carriers are reported to the serving cell NodeB. Moreover, measurement parameters of multiple carriers are obtained, and specific measurement parameters to be sent are selected according to a selection rule. In this way, the serving cell NodeB knows the carriers of the neighboring cell that are affected by the UE.

A measurement report receiving method and a NodeB are provided in an embodiment of the present invention to receive measurement parameters in a multi-band system.

The following technical solution is put forward:

A method for receiving a measurement report includes:
receiving a measurement report sent by a UE, where the measurement report includes a measurement parameter and a carrier indication indicating a carrier corresponding to the measurement parameter; and
determining, according to a pre-stored mapping relation between the carrier indication and the carrier, the carrier corresponding to the measurement parameter.

A NodeB includes:
a measurement report receiving unit, configured to receive a measurement report sent by a UE, where the measurement report includes a measurement parameter and a carrier indication indicating a carrier corresponding to the measurement parameter; and
a determining unit, configured to determine, according to a mapping relation between the carrier indication and the carrier, the carrier corresponding to the measurement parameter.

In the preceding embodiment, the carriers corresponding to the measurement parameters reported by the UE in the multi-band system are determined according to the mapping relation between the carrier indications and the carriers.

BRIEF DESCRIPTION OF THE DRAWINGS

To describe the technical solution under the present invention more clearly, the following outlines the accompanying drawings involved in the embodiments of the present invention. Apparently, the accompanying drawings outlined below are not exhaustive, and persons of ordinary skill in the art can derive other drawings from such accompanying drawings without creative effort.

DETAILED DESCRIPTION OF THE EMBODIMENTS

Figure 1:
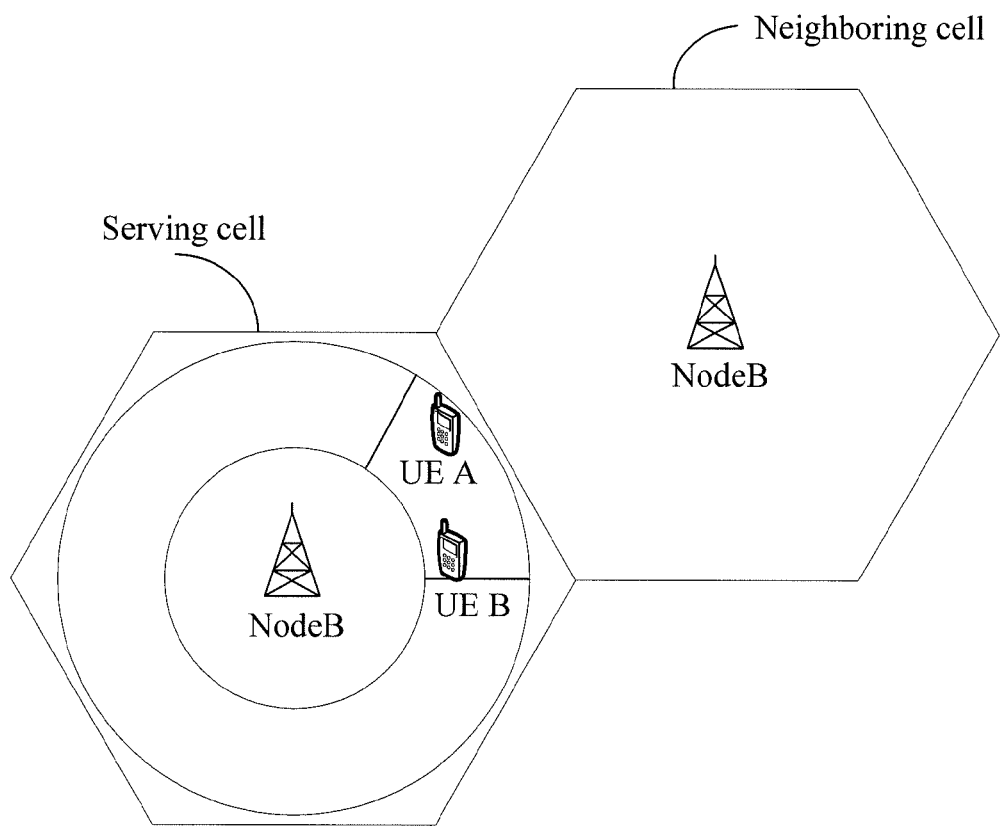
FIG. 1 is a schematic diagram of inter-cell interference in the prior art.

The following detailed description is given with reference to the accompanying drawings to provide a clear description of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

An embodiment of the invention provides a method for determining a User Equipment (UE) or UEs affecting a neighboring cell. The method includes receiving load information sent by the neighboring cell, wherein the load information indicates an interfered Physical Resource Block (PRB) of the neighboring cell; determining a UE or UEs that occupy, when scheduling is performed, the interfered PRB; determining a UE or UEs located in an Inter-Cell Interference Coordination (ICIC) measurement area corresponding to the neighboring cell; and obtaining an intersection of the UE or UEs that occupy, when scheduling is performed, the interfered PRB and the UE or UEs located in the ICIC measurement area corresponding to the neighboring cell.

In another embodiment of the invention, the load information includes an Overload Indication (OI) and a High Interference Indication (HII); and the determining the UE or UEs that occupy, when scheduling is performed, the interfered PRB includes searching for a UE or UEs that occupy, when scheduling is performed, the interfered PRB indicated by the OI in a first time segment, wherein the first time segment is a time segment before the time of receiving the load information sent by the neighboring cell; and/or searching for a UE or UEs that occupy the PRB to be interfered as indicated by the HII in a second time segment, wherein the second time segment is a time segment after the time of receiving the load information sent by the neighboring cell.

In another embodiment of the invention, after obtaining the intersection of the UE or UEs that occupy, when scheduling is performed, the interfered PRB and the UE or UEs located in the ICIC measurement area corresponding to the neighboring cell, the method further includes obtaining a maximum value among Reference Signal Received Power (RSRP) measurement values reported by the UE or UEs in the intersection, and determining a UE that reports the maximum value as a UE to be adjusted.

In another embodiment of the invention, the load information comprises a carrier indication, an Overload Indication (OI), and a High Interference Indication (HII); and the step of determining the UE or UEs that occupy, when scheduling is performed, the interfered PRB comprises: obtaining carriers corresponding to the OI and HII according to the carrier indication; searching for the UE or UEs that occupy, when scheduling is performed, the interfered PRB in the carrier indicated by the OI in a first time segment; and/or searching for the UE or UEs that occupy, when scheduling is performed, the PRB to be interfered in the carrier indicated by the HII in a second time segment.

In another embodiment of the invention, the method further includes: receiving Reference Signal Received Power (RSRP) measurement values of multiple carriers of the neighboring cell from the UE, wherein the measurement report comprises: an identity (ID) of the neighboring cell, a maximum RSRP measurement value among the RSRP measurement values of the multiple carriers, and a carrier indication corresponding to the maximum RSRP measurement value; or the measurement report comprises: the ID of the neighboring cell, the RSRP measurement values of the multiple carriers, and carrier indications corresponding to the RSRP measurement values of the multiple carriers respectively; the step of determining the UE or UEs located in the ICIC measurement area corresponding to the neighboring cell includes determining, by a serving cell NodeB, the UE or UEs located in the ICIC measurement area corresponding to the neighboring cell according to the ID of the neighboring cell and the RSRP measurement values in the measurement report.

In another embodiment of the invention, the method further includes searching for the UE or UEs whose carrier(s) indicated by the carrier indication in the measurement report is the same as the carrier(s) indicated by the carrier indication in the load information among the UE or UEs located in the ICIC measurement area corresponding to the neighboring cell; the step of obtaining the intersection of the UE or UEs that occupy, when scheduling is performed, the interfered PRB and the UE or UEs located in the ICIC measurement area corresponding to the neighboring cell is: obtaining the intersection of the UE or UEs that occupy, when scheduling is performed, the interfered PRB and the found UE or UEs whose carrier(s) indicated by the carrier indication in the measurement report is the same as the carrier(s) indicated by the carrier indication in the load information.

In another embodiment of the invention, the method further includes obtaining a maximum value among the RSRP measurement values corresponding to the carrier indicated by the carrier indication according to the RSRP measurement values reported by the UE or UEs in the intersection and the corresponding carrier indication, and determining a UE that reports the maximum value as a UE to be adjusted.

In another embodiment of the invention, if the maximum value is reported by more than one UE, the method further includes selecting, according to location information of the determined UE to be adjusted, a UE closest to the neighboring cell for adjustment, wherein the location information of the UE to be adjusted is determined according to a Global Positioning System (GPS) positioning result reported by the UE to be adjusted.

Embodiment 1

Figure 2:
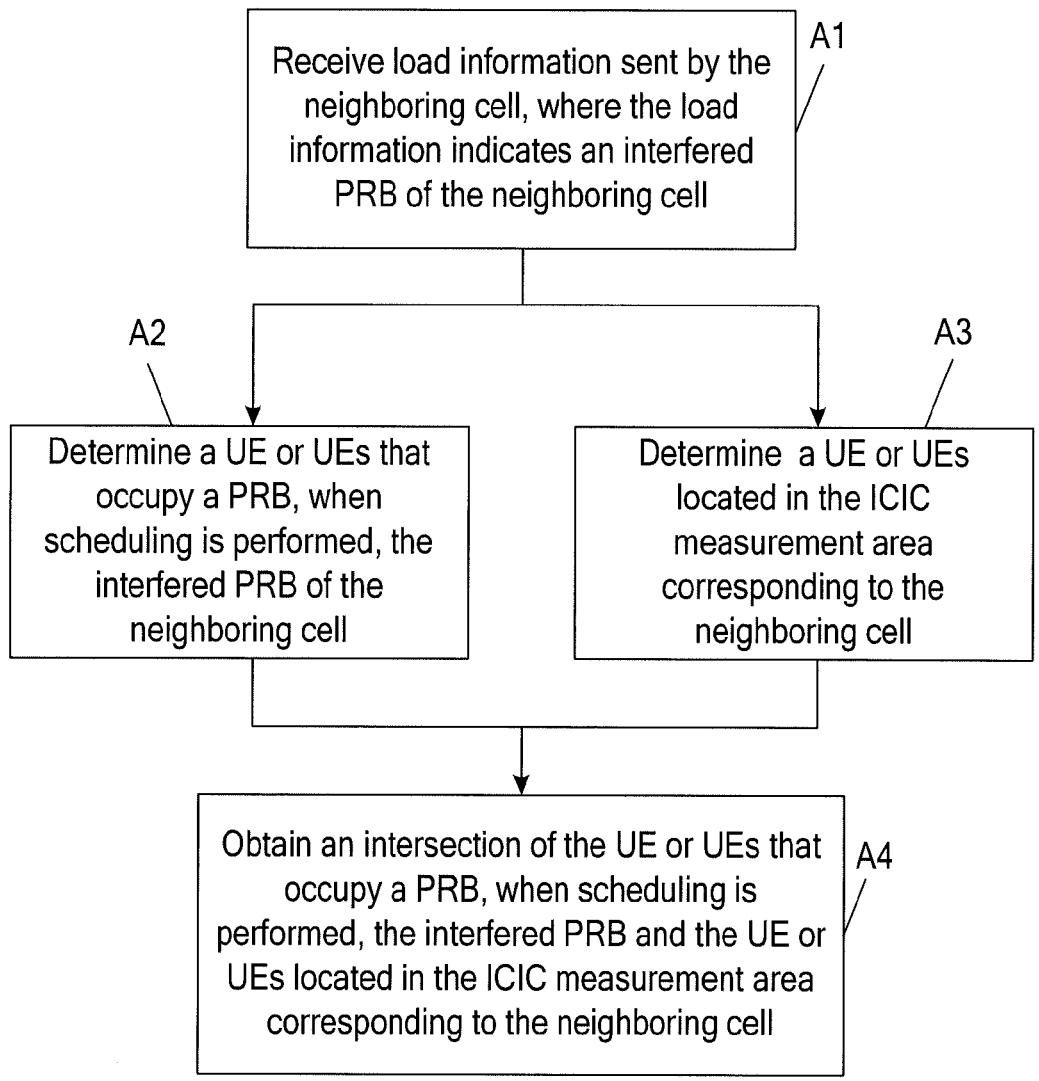
FIG. 2 is a flowchart of a method for determining a UE or UEs affecting a neighboring cell according to a first embodiment of the present invention.

As shown in FIG. 2, a method for determining a UE or UEs affecting a neighboring cell according to the first embodiment of the present invention includes the following steps:

A1. Receive load information sent by a neighboring cell.

The load information indicates an interfered PRB of the neighboring cell.

A2. Determine a UE or UEs that occupy, when scheduling is performed, the interfered PRB.

A3. Determine a UE or UEs located in an ICIC measurement area corresponding to the neighboring cell.

A4. Obtain an intersection of the UE or UEs that occupy, when scheduling is performed, the interfered PRB and the UE or UEs located in the ICIC measurement area corresponding to the neighboring cell.

In the first embodiment of the present invention, the system determines the UE or UEs that occupy, when scheduling is performed, the interfered PRB of the neighboring cell, namely, determines the UE chronologically likely to affect the neighboring cell; and then determines the UE or UEs located in the ICIC measurement area corresponding to the neighboring cell, namely, determines the UE spatially likely to affect the neighboring cell. Then the system obtains the intersection of the foregoing two types of UEs, thus determining the UE or UEs that occupy, when scheduling is performed, the interfered PRB of the neighboring cell, and located in the ICIC measurement area corresponding to the neighboring cell. In this way, the UE affecting the neighboring cell is determined accurately from perspectives of time and space.

Embodiment 2

Figure 3:
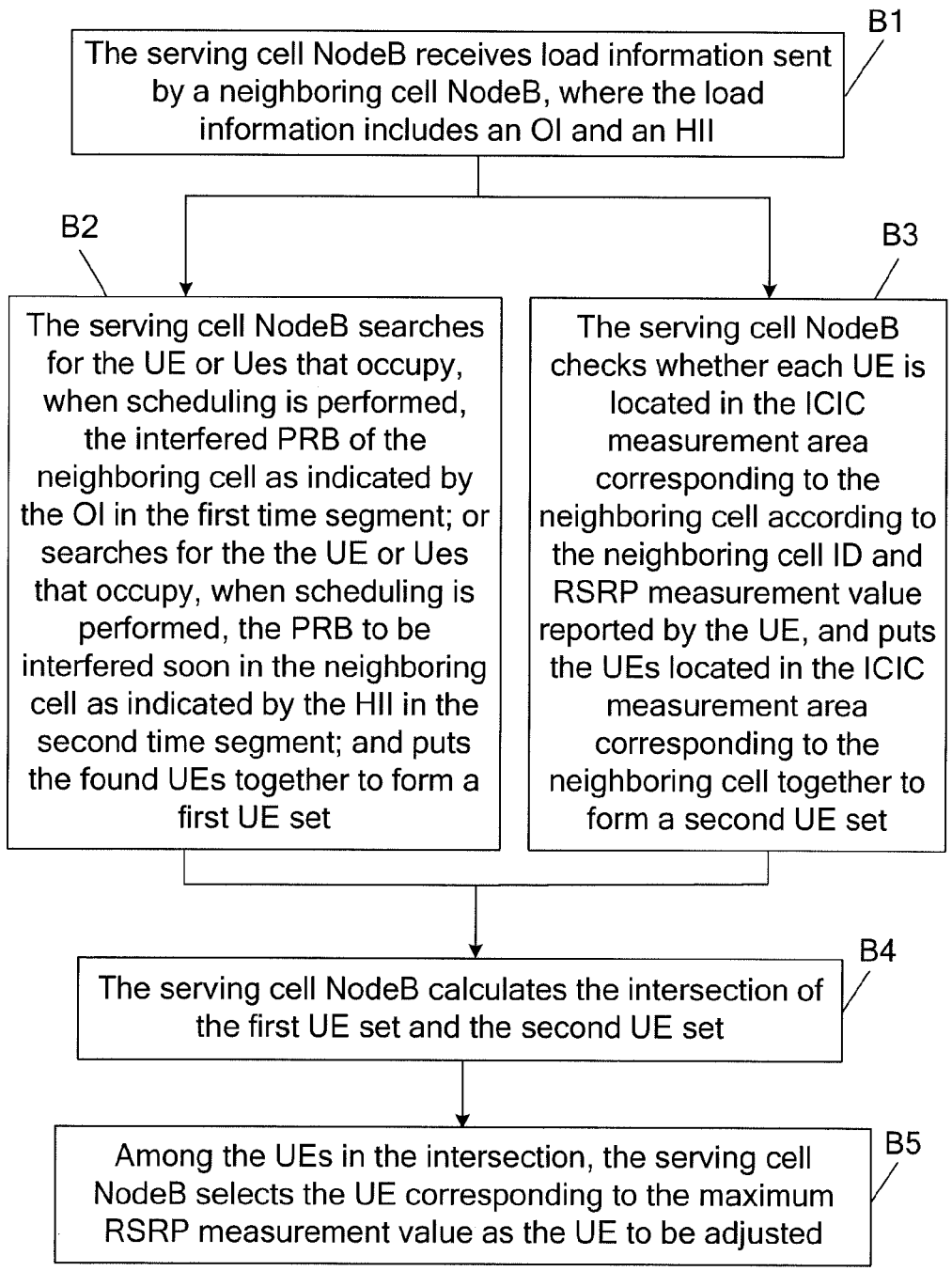
FIG. 3 is a flowchart of a method for determining a UE or UEs affecting a neighboring cell according to a second embodiment of the present invention.

As shown in FIG. 3, a method for determining a UE or UEs affecting a neighboring cell according to the second embodiment of the present invention is applicable to a single-band system, and includes the following steps:

B1. The serving cell NodeB receives load information sent by a neighboring cell NodeB.

The load information carries: an Overload Indication (OI) and a High Interference Indication (HII), where the OI indicates the interference level suffered by each PRB in the first time segment, and the interference level may be High Interference (HI), Medium Interference (MI) or Low Interference (LI). The first time segment is the time segment before the time of receiving the load information, and may be an interval of the neighboring cell sending the load information. When the interference level suffered by the PRB is HI or MI, it indicates that the PRB is already interfered. The HII indicates whether each PRB is to be interfered in the second time segment. If the value of the HII is 1, the PRB is to be interfered; if the value of the HII is 0, the PRB is not to be interfered. The second time segment is the time segment after the time of receiving the load information sent by the neighboring cell, and may be an interval of the neighboring cell sending the load information.

B2. The serving cell NodeB searches for a UE or UEs that occupy, when scheduling is performed, the interfered PRB of the neighboring cell as indicated by the OI in the first time segment; and searches for a UE or UEs that occupy, when scheduling is performed, the PRB to be interfered soon in the neighboring cell as indicated by the HII in the second time segment; puts the found UEs together to form a first UE set, and inputs the corresponding information into a resource scheduling table, as shown in Table 1.

Alternatively, the first UE set includes only the UE or UEs that occupy, when scheduling is performed, the interfered PRB of the neighboring cell as indicated by the OI in the first time segment; or includes only the UE or UEs that occupy, when scheduling is performed, the PRB to be interfered soon in the neighboring cell as indicated by the HII in the second time segment.

TABLE 1

| UE | Scheduling Time | PRB Occupied |
|---|---|---|
| UE1 | Framenumber | $n_1$ and $N_1$ |
| UEi | Framenumber | $n_i$ and $N_i$ |

UEi represents the UE numbered i in the first UE set; Framenumber represents the frame number used at the time of scheduling the UE; $n_i$ represents the PRB number used by UE i; and $N_i$ represents the set of PRBs available to UE i, where $n_i \in N_i$. If the PRB occupied, when scheduling is performed, by the UE in the first time segment is the same as the interfered PRB of the neighboring cell as indicated by the OI, and, if the PRB occupied, when scheduling is performed, the UE in the second time segment is the same as the PRB to be interfered soon in the neighboring cell as indicated by the HII, the following information can be stored for this UE simultaneously: Framenumber used at the time of scheduling in the first time segment, PRB number used at the time of scheduling in the first time segment, Framenumber used at the time of scheduling in the second time segment, and PRB number used at the time of scheduling in the second time segment. The present invention is not limited in this aspect.

Supposing PRBs numbered 1, 2, 4, 6 and 8 are available to UE i, and UE i occupies PRBs numbered 1, 2, 4 and 6 in the first time segment and/or second time segment, $n_i = \{1, 2, 4, 6\}$; and $N_i = \{1, 2, 4, 6, 8\}$.

B3. After receiving the load information sent by the neighboring cell NodeB, the serving cell NodeB searches for the measurement reports submitted by UEs, and may further search for the result of positioning the UEs in the Global Positioning System (GPS). The measurement report includes the neighboring cell identity (ID) and the measurement parameters, and the measurement parameters may be RSRP measurement values. The serving cell NodeB checks, according to the neighboring cell ID and RSRP measurement value reported by the UE, whether each UE is located in the ICIC measurement area corresponding to the neighboring cell, puts the UEs located in the ICIC measurement area corresponding to the neighboring cell together to form a second UE set, and inputs the corresponding information into the ICIC measurement area user list.

Before step B3, the UE measures the neighboring cell to obtain the RSRP measurement value of the neighboring cell. If the RSRP measurement value of the neighboring cell is greater than the RSRP measurement value of the serving cell by one offset, it means that the UE has a tendency of moving toward the edge of the serving cell. If the RSRP measurement value of the neighboring cell is smaller than the RSRP measurement value of the serving cell by one offset, it means that the UE has a tendency of moving toward the center of the serving cell. The UE reports the neighboring cell ID and the RSRP measurement value to the serving cell NodeB. Meanwhile, the UE may report the positioning result of the GPS.

Specifically, the ICIC measurement area user list is shown in Table 2:

TABLE 2

| | RSRP Measurement Value (dB) | | | Location | Neighboring |
|---|---|---|---|---|---|
| UE | −6 to −4 | −4 to −2 | −2 to −0 | Information | Cell ID |
| UE1 | | x | | Location1 | |
| UEj | | | x | Location j | |

To facilitate the serving cell NodeB to determine subsequently the UE to be adjusted, this step may further include: determining the location information of the UE according to the GPS positioning result reported by the UE, namely, determining the distance between the UE and the neighboring cell, and inputting the location information into Table 2. $UE_j$ represents the UE numbered j in the second UE set.

B4. The serving cell NodeB finds the UEs, located in the ICIC measurement area corresponding to the neighboring cell and occupying, when scheduling is performed, the interfered PRB indicated by the LI, namely, calculates the interconnection of the first UE set and the second UE set.

By now, the UE or UEs that affect the neighboring cell have been determined. If more than one UE affects the neighboring cell, the UE to be adjusted may be determined through the following step:

B5. According to the RSRP measurement values corresponding to the UEs in the intersection (namely, the RSRP measurement values reported by the UEs in the intersection), the serving cell NodeB selects the UE corresponding to the maximum RSRP measurement value as the UE to be adjusted.

If more than one UE corresponds to the maximum value, the UE closest to the neighboring cell is selected as the UE to be adjusted according to the location information in Table 2.

Subsequently, the UE is adjusted to reduce the impact caused by the UE onto the neighboring cell.

In the preceding embodiment, the UE or UEs that occupy, when scheduling is performed, the interfered PRB of the neighboring cell, make up the first UE set, which includes the UE or UEs chronologically likely to affect the neighboring cell; and the UE or UEs located in the ICIC measurement area corresponding to the neighboring cell make up the second UE set, which includes the UE or UEs spatially likely to affect the neighboring cell. Then the intersection of the first UE set and the second UE set is obtained, which is equivalent to determining the UE or UEs that occupy, when scheduling is performed, the interfered PRB of the neighboring cell, and located in the ICIC measurement area corresponding to the neighboring cell. In this way, the UE or UEs affecting the neighboring cell are determined accurately from perspectives of time and space.

Embodiment 3

Figure 4:
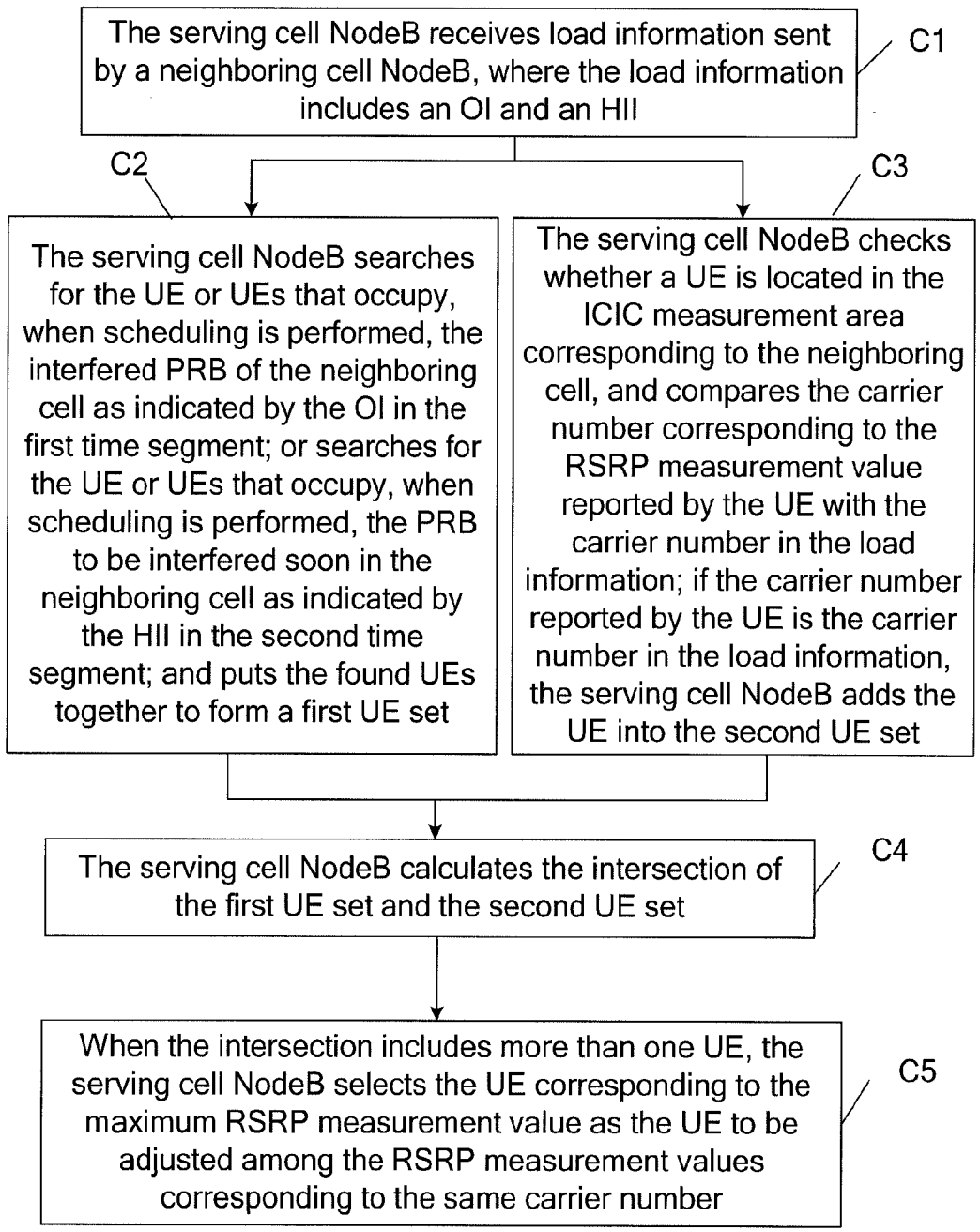
FIG. 4 is a flowchart of a method for determining a UE or UEs affecting a neighboring cell according to a third embodiment of the present invention.

As shown in FIG. 4, a method for determining a UE or UEs affecting a neighboring cell according to the third embodiment of the present invention is applicable to a multi-band system, and includes the following steps:

C1. The serving cell NodeB receives load information sent by a neighboring cell NodeB.

The load information carries a carrier indication, an OI, and an HII. The carrier indication indicates the carrier corresponding to the OI and the HII. The meanings of the OI and the HII are the same as those described in the first embodiment above, and are not further described.

The carrier indication may be a carrier number. For example, the logical format of the load information is shown in Table 3.

TABLE 3

| $k_{ij}$ | $OI_{ij}$ | $HII_{ij}$ |
| --- | --- | --- |

In Table 3, $k_{ij}$ represents carrier j occupied by UE i; $OI_{ij}$ indicates whether each PRB in carrier j occupied by UE i is already interfered; $HII_{ij}$ indicates whether each PRB in carrier j occupied by UE i is to be interfered soon. Table 3 is only an exemplary format of the load information provided in this embodiment of the present invention. The format of the load information shall not be construed as a limitation on the present invention.

C2. According to the carrier indication, the serving cell NodeB obtains the carriers corresponding to the OI and the HII, searches for the UE or UEs that occupy, when scheduling is performed, the interfered PRB in the carrier indicated by the OI in the first time segment, and/or searches for the UE or UEs that occupy, when scheduling is performed, the PRB to be interfered soon in the carrier indicated by the HII in the second time segment. The serving cell NodeB puts the found UE or UEs into a first UE set, and inputs the corresponding information to the resource scheduling table, as shown in Table 4.

TABLE 4

| UE | Scheduling Time | Carrier Number | PRB Occupied |
| --- | --- | --- | --- |
| UE1 | Framenumber | $k_{1j}$ | $n_{1j}$ and $N_{1j}$ |
| UEi | Framenumber | $k_{ij}$ | $n_{ij}$ and $N_{ij}$ |

In Table 4, UEi represents the UE numbered i in the first UE set; Framenumber represents the frame number used at the time of scheduling the UE; $k_{ij}$ represents carrier j occupied by UE i; $n_{ij}$ represents the PRB number of carrier j occupied by UE i; and $N_{ij}$ represents the set of PRBs of carrier j available to UE i, where $n_{ij} \in N_{ij}$.

For example, in a multi-band system such as a Long Term Evolution-Advanced (LTE-A) system, each cell may have six bands, as detailed below:
(1) 450-470 MHz band
(2) 698-862 MHz band
(3) 790-862 MHz band
(4) 2.3-2.4 GHz band
(5) 3.4-4.2 GHz band
(6) 4.4-4.99 GHz band For example, the neighboring cell may use 20 MHz (450-470 MHz) in the first band as carrier 1, use 700-720 MHz in the second band as carrier 2, and use 720-730 MHz in the third band as carrier 3; the serving cell may use 20 MHz (450-470 MHz) in the first band as carrier 1, use 700-710 MHz in the second band as carrier 2, and use 710-720 MHz in the third band as carrier 3. Therefore, before this step, two cells (such as the serving cell and the neighboring cell in this embodiment) need to send carrier aggregation related information to the opposite party first. The carrier aggregation related information carries the detailed carrier information corresponding to the carrier number. For example, the neighboring cell needs to send carrier aggregation related information to the serving cell; in the carrier aggregation related information, carrier 1 represents 450-470 MHz, carrier 2 represents 700-720 MHz, and carrier 3 represents 720-730 MHz.

After receiving the load information in this step, the serving cell finds, according to the carrier number in the load information, the corresponding carrier, determines, according to the OI corresponding to the carrier number, whether the PRB in this carrier of the neighboring cell is already interfered, determines, according to the HII corresponding to the carrier number, whether the PRB in the carrier of the neighboring cell is to be interfered soon, searches for the UE or UEs that occupy, when scheduling is performed, the PRB of the interfered carrier in the neighboring cell in the first time segment, and searches for the UE or UEs that occupy, when scheduling is performed, the PRB of the carrier to be interfered soon in the neighboring cell in the second time segment.

C3. After receiving the load information sent by the neighboring cell NodeB, the serving cell NodeB searches for the measurement reports submitted by the UE or UEs, and may further search for the result of positioning the UE or UEs in the GPS. The measurement report includes the neighboring cell ID, measurement parameters, and carrier indications corresponding to the measurement parameters (the carrier indication may be a carrier number), where the measurement parameters may be RSRP measurement values. The serving cell NodeB checks, according to the neighboring cell ID and RSRP measurement value reported by the UE, whether the UE is located in the ICIC measurement area corresponding to the neighboring cell, and compares the carrier number corresponding to the RSRP measurement value reported by the UE with the carrier number in the load information. If the carrier number reported by the UE is the carrier number in the load information, the serving cell NodeB adds the UE into the second UE set, and inputs the corresponding information into the ICIC measurement area user list.

Before step C3, the serving cell NodeB sends an indication message to the UE, instructing the UE to measure multiple carriers of the neighboring cell. The indication message may carry a mapping relation between the carrier number of the neighboring cell and the carrier. Alternatively, the mapping relation between the carrier number of the neighboring cell and the carrier is notified to the UE by other means. The UE measures multiple carriers of the neighboring cell, obtains the RSRP measurement values of multiple carriers of the neighboring cell, and reports the ID of the neighboring cell, the maximum RSRP measurement value and the carrier number corresponding to the maximum value to the serving cell NodeB, or reports the neighboring cell ID, multiple RSRP measurement values and the corresponding carrier number to the serving cell NodeB. Meanwhile, the UE may report the positioning result of the GPS.

Specifically, the ICIC measurement area user list is shown in Table 5. Supposing the carrier numbers reported by UE1 are carrier 1, carrier 2, and carrier 3, and the corresponding RSRP measurement values are −2 to −0, −4 to −2, and −6 to −4, Table 5 may be filled like this:

TABLE 5

| UE | RSRP Measurement Value (dB) | | | Location Information | Neighboring Cell ID | Carrier Information |
|---|---|---|---|---|---|---|
| | −6 to −4 | −4 to −2 | −2 to −0 | | | |
| UE1 | | | x | Location 1 | Neighboring cell ID | 1 |
| UE1 | | x | | Location 1 | Neighboring cell ID | 2 |
| UE1 | x | | | Location 1 | Neighboring cell ID | 3 |
| $UE_m$ | | | | Location m | | $k_{mj}$ |

To facilitate the serving cell NodeB to determine subsequently the UE to be adjusted, this step may further include: determining the location information of the UE according to the GPS positioning result reported by the UE, namely, determining the distance between the UE and the neighboring cell, and inputting the location information into Table 5.

In Table 5, $UE_m$ represents the UE numbered m in the second UE set; $k_{mj}$ represents carrier j reported by UE m; the carrier information may be $K_m$, which indicates the set of carriers existent in the neighboring cell and available to UE m.

C4. The serving cell NodeB calculates the intersection of the first UE set and the second UE set to determine the UE or UEs that affect the neighboring cell.

By now, the UE or UEs that affect the neighboring cell have been determined. If more than one UE affects the neighboring cell, the UE to be adjusted may be determined through the following steps:

C5. When the intersection includes more than one UE, the serving cell NodeB selects the UE corresponding to the maximum RSRP measurement value as the UE to be adjusted among the RSRP measurement values corresponding to the same carrier number. If more than one UE corresponds to the maximum value, the UE closest to the neighboring cell is selected as the UE to be adjusted according to the location information in Table 5.

In the third embodiment, the UE or UEs that occupy, when scheduling is performed, the interfered PRB of the neighboring cell make up the first UE set, which includes the UE or UEs chronologically likely to affect the neighboring cell; and the UE or UEs located in the ICIC measurement area corresponding to the neighboring cell are determined, and the carrier number corresponding to the RSRP measurement value reported by the determined UE is compared with the carrier number in the load information; if the carrier number reported by the UE is the carrier number in the load information, the UE is added into the second UE set, and therefore, the second UE set includes the UE or UEs spatially likely to affect the neighboring cell; by calculating the intersection of the first UE set and the second UE set, the UE or UEs affecting the neighboring cell are determined accurately from perspectives of time and space.

Embodiment 4

Figure 5:
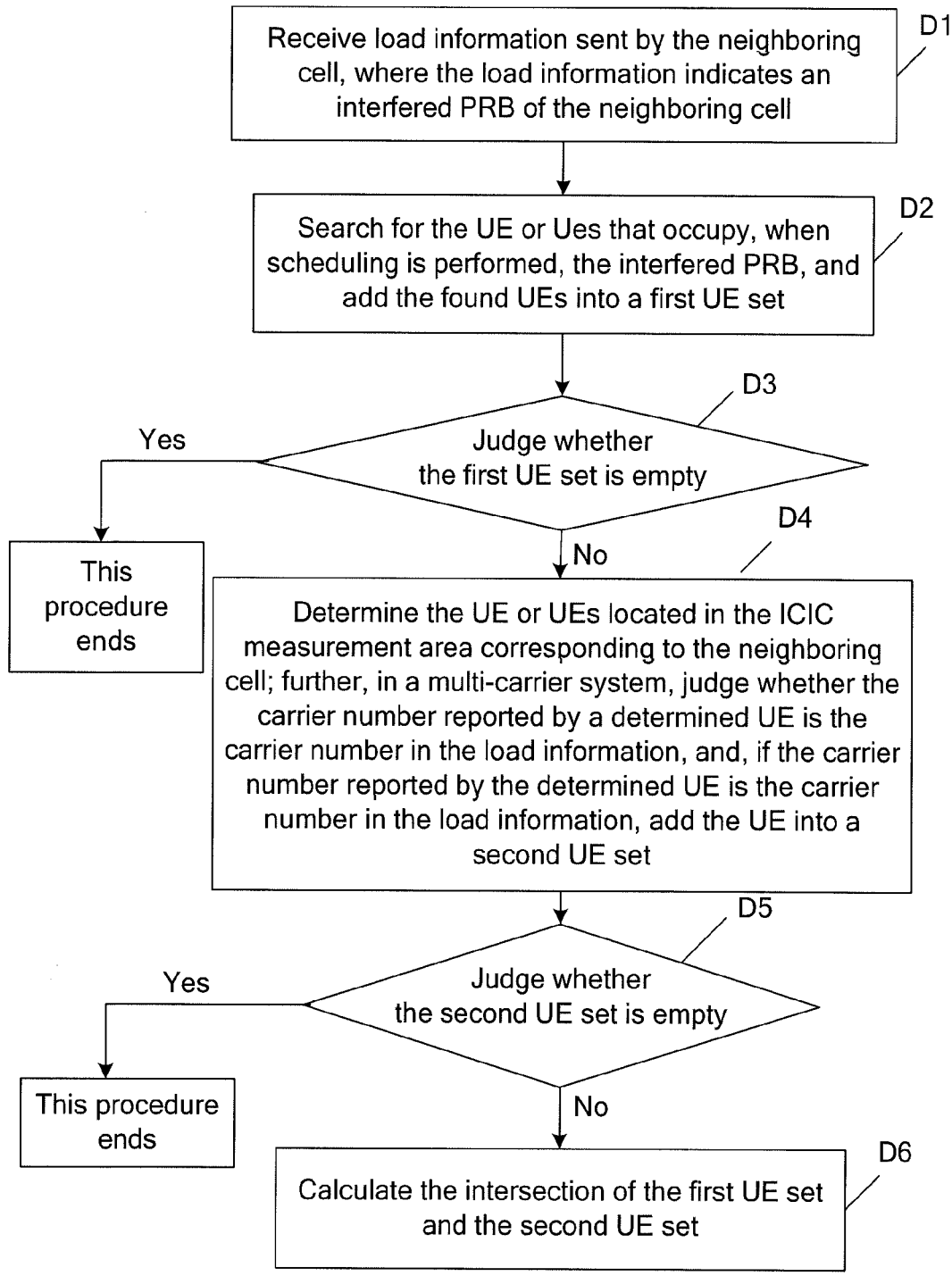
FIG. 5 is a flowchart of a method for determining a UE or UEs affecting a neighboring cell according to a fourth embodiment of the present invention.

As shown in FIG. 5, a method for determining a UE or UEs affecting a neighboring cell according to the fourth embodiment of the present invention includes the following steps:

D1. Receive load information sent by the neighboring cell, where the load information indicates an interfered PRB of the neighboring cell.

D2. Search for the UE or UEs that occupy, when scheduling is performed, the interfered PRB, and add the found UE or UEs into a first UE set.

D3. Judge whether the first UE set is empty; if the first UE set is empty, the procedure ends; if the first UE set is not empty, the procedure proceeds to step D4.

D4. Determine the UE or UEs located in the ICIC measurement area corresponding to the neighboring cell. Further, in a multi-band system, judge whether the carrier number reported by a determined UE is the carrier number in the load information; and, if the carrier number reported by the determined UE is the carrier number in the load information, add the UE into a second UE set.

D5. Judge whether the second UE set is empty; if the second UE set is empty, the procedure ends; if the second UE set is not empty, the procedure proceeds to step D6.

D6. Calculate the intersection of the first UE set and the second UE set to determine the UE or UEs that affect the neighboring cell. The procedure ends.

In the fourth embodiment, the UE or UEs that occupy, when scheduling is performed, the interfered PRB of the neighboring cell make up the first UE set, which includes the UE or UEs chronologically likely to affect the neighboring cell; and the UE or UEs located in the ICIC measurement area corresponding to the neighboring cell make up the second UE set, which includes the UE or UEs spatially likely to affect the neighboring cell. Then the intersection of the first UE set and the second UE set is obtained, which is equivalent to determining the UE or UEs that occupy, when scheduling is performed, the interfered PRB of the neighboring cell, and located in the ICIC measurement area corresponding to the neighboring cell. In this way, the UE or UEs affecting the neighboring cell are determined accurately from perspectives of time and space. Further, if it is determined that the first UE set is not empty, the UE or UEs compliant with the conditions of the second UE set are found, thus preventing the serving cell NodeB from performing unnecessary operations when the first UE set is empty (namely, no UE affects the neighboring cell).

Embodiment 5

Figure 6A:
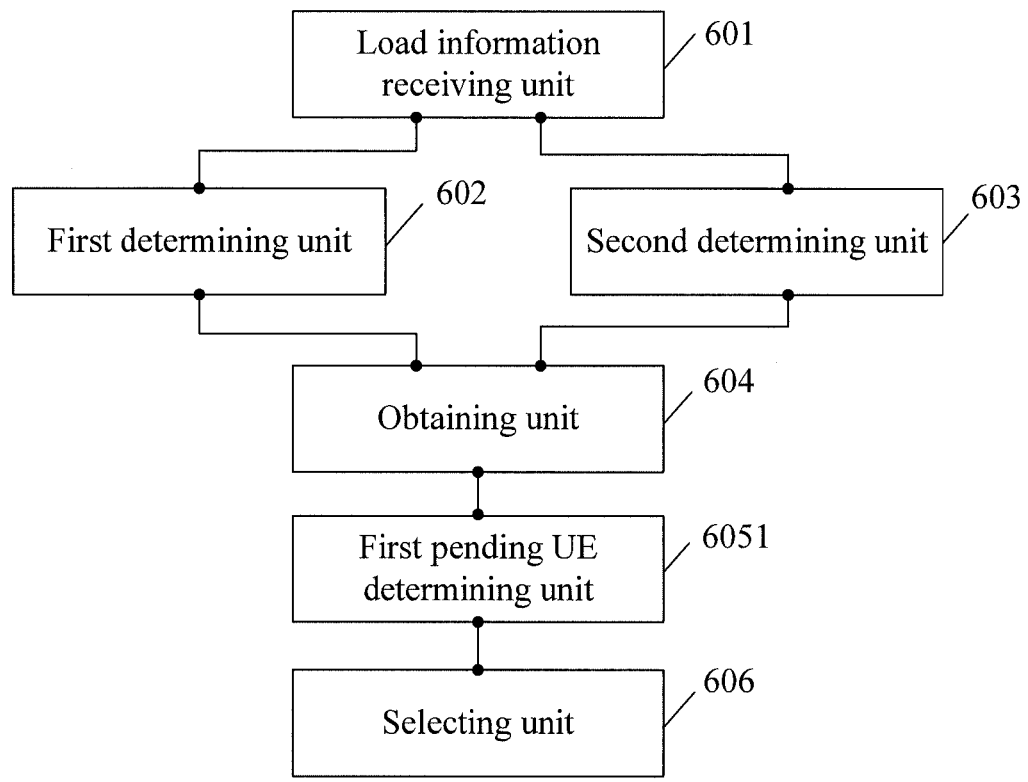
FIG. 6A is a structure diagram of an NE located in a single-band system according to a fifth embodiment of the present invention.
Figure 6B:
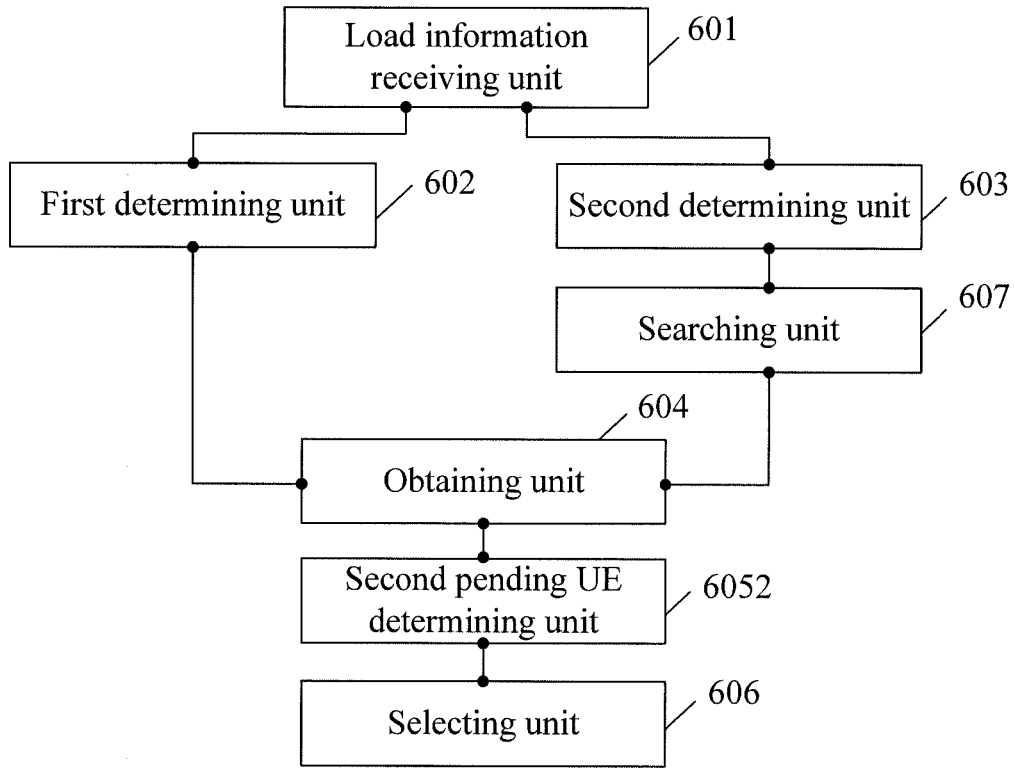
FIG. 6B is a structure diagram of an NE located in a multi-band system according to the fifth embodiment of the present invention.

As shown in FIG. 6A and FIG. 6B, an NE provided in the fifth embodiment of the present invention includes:

a load information receiving unit 601, configured to receive load information sent by a neighboring cell, where the load information indicates an interfered PRB of the neighboring cell;

a first determining unit 602, configured to determine the UE or UEs that occupy, when scheduling is performed, the interfered PRB;

a second determining unit 603, configured to determine UE or UEs located in an ICIC measurement area corresponding to the neighboring cell; and an obtaining unit 604, configured to obtain an intersection of the UE or UEs determined by the first determining unit and the UE or UEs determined by the second determining unit.

For a single-band system, the load information includes an OI and an HII. Specifically, the first determining unit 602 is configured to search for the UE or UEs that occupy, when scheduling is performed, the interfered PRB indicated by the OI in the first time segment, and/or search for the UE or UEs that occupy, when scheduling is performed, the PRB to be interfered soon as indicated by the HII in the second time segment. The first time segment is the time segment before the time of receiving the load information sent by the neighboring cell, and the second time segment is the time segment after the time of receiving the load information sent by the neighboring cell.

To further narrow the scope of the UE or UEs to be adjusted, the NE may further include a first pending UE determining unit 6051, which is configured to obtain the maximum value among the RSRP measurement values reported by the UE or UEs in the intersection obtained by the obtaining unit, and determine the UE that reports the maximum value as the UE to be adjusted.

For a multi-band system, the load information includes a carrier indication, an OI, and an HII. The first determining unit 602 includes: a carrier mapping unit, configured to find the carriers corresponding to the OI and HII according to the carrier indication; a searching unit, configured to search for the UE or UEs that occupy, when scheduling is performed, the interfered PRB in the carrier indicated by the OI in the first time segment, and/or search for the UE or UEs that occupy, when scheduling is performed, the PRB to be interfered soon in the carrier indicated by the HII in the second time segment. The second determining unit 603 includes: a measurement report receiving unit, configured to receive a measurement report sent by a UE, where the measurement report includes a neighboring cell ID, an RSRP measurement value, and a carrier indication indicating the carrier corresponding to the RSRP measurement value; and a UE location determining unit, configured to determine, according to the neighboring cell ID and RSRP measurement value in the measurement report, that the UE is located in an ICIC measurement area corresponding to the neighboring cell.

For a multi-band system, the NE further includes: a searching unit 607, configured to search for the UE or UEs whose carrier indicated by the carrier indication in the measurement report is the same as the carrier indicated by the carrier indication in the load information among the UE or UEs located in the ICIC measurement area corresponding to the neighboring cell. In this case, the obtaining unit 604 obtains the intersection of the UE or UEs that occupy, when scheduling is performed, the interfered PRB and the UE or UEs found by the searching unit.

To further narrow the scope of the UE or UEs to be adjusted, the NE may further include a second pending UE determining unit 6052, which is configured to, according to the RSRP measurement value reported by the UE in the intersection obtained by the obtaining unit and the corresponding carrier indication, obtain the maximum value among the RSRP measurement values corresponding to the carrier indicated by the carrier indication, and determine the UE that reports the maximum value as the UE to be adjusted.

For single-band systems and multi-band systems, in order to precisely determine the UE to be adjusted, the NE further includes: a selecting unit 606, configured to select, according to the location information of the determined UE, the UE closest to the neighboring cell for adjustment if the first pending UE determining unit 6051 or the second pending UE determining unit 6052 determines that the maximum value is reported by more than one UE, where the location information of the UE is determined according to the GPS positioning result reported by the UE.

It is understandable that the accompanying drawings or embodiments given herein are illustrative in nature, and representative of logical structures. The modules shown as stand-alone components may be physically separated or not, and the components shown as modules may be physical units or not, namely, they may be located on the same entity or distributed on several network entities.

The NE in this embodiment is configured to execute the foregoing method for determining UE or UEs affecting a neighboring cell.

In the fifth embodiment, the first determining unit determines the UE or UEs that occupy, when scheduling is performed, the interfered PRB of the neighboring cell, thus finding the UE or UEs chronologically likely to affect the neighboring cell; and the second determining unit determines the UE or UEs located in the ICIC measurement area corresponding to the neighboring cell, thus finding the UE or UEs spatially likely to affect the neighboring cell. Then the intersection of the UE or UEs determined by the first determining unit and the UE or UEs determined by the second determining unit is obtained, which is equivalent to determining the UE or UEs that occupy, when scheduling is performed, the interfered PRB of the neighboring cell; and located in the ICIC measurement area corresponding to the neighboring cell. In this way, the UE or UEs affecting the neighboring cell are determined accurately from perspectives of time and space.

Embodiment 6

A network system provided in the sixth embodiment includes:

a neighboring cell NodeB, configured to send load information to a serving cell NodeB, where the load information indicates an interfered PRB of a neighboring cell; and the serving cell NodeB, configured to: receive the load information sent by the neighboring cell NodeB; determine UE or UEs that occupy, when scheduling is performed, the interfered PRB; determine UE or UEs located in an ICIC measurement area corresponding to the neighboring cell; and obtain an intersection of the UE or UEs that occupy, when scheduling is performed, the interfered PRB and the UE or UEs located in the ICIC measurement area corresponding to the neighboring cell.

The network system in this embodiment is configured to execute the foregoing method for determining UE or UEs affecting a neighboring cell.

In the sixth embodiment of the present invention, the system determines the UE or UEs that occupy, when scheduling is performed, the interfered PRB of the neighboring cell, namely, determines the UE or UEs chronologically likely to affect the neighboring cell; and then determines the UE or UEs located in the ICIC measurement area corresponding to the neighboring cell, namely, determines the UE or UEs spatially likely to affect the neighboring cell. Then the system obtains the intersection of the foregoing two types of UE or UEs, thus determining the UE or UEs that occupy, when scheduling is performed, the interfered PRB of the neighboring cell, and located in the ICIC measurement area corresponding to the neighboring cell. In this way, the UE or UEs affecting the neighboring cell are determined accurately from perspectives of time and space.

Embodiment 7

Figure 7:
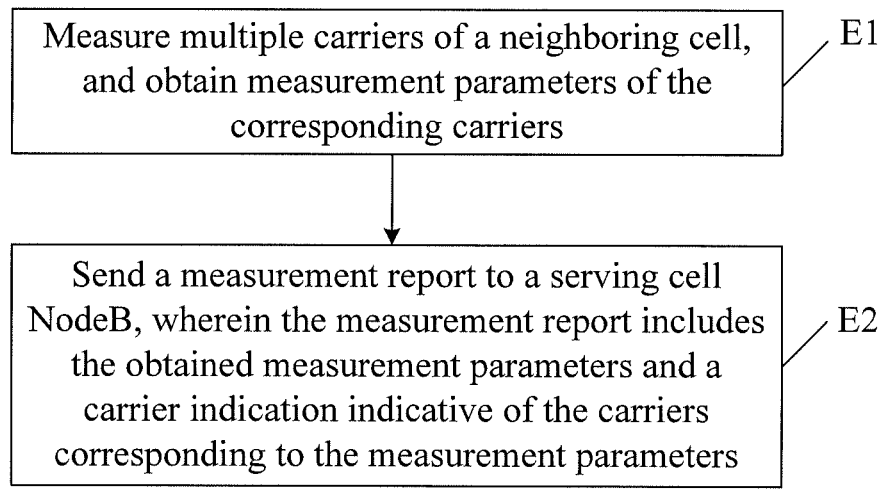
FIG. 7 is a flowchart of a method for submitting a measurement report according to a seventh embodiment of the present invention.

As shown in FIG. 7, a method for submitting a measurement report according to the seventh embodiment of the present invention includes the following steps:

E1. Measure multiple carriers of a neighboring cell, and obtain measurement parameters of the corresponding carriers.

E2. Send a measurement report to a serving cell NodeB, where the measurement report includes a neighboring cell ID, the obtained measurement parameters and carrier indications indicating carriers corresponding to the measurement parameters. The carrier indication may be a carrier number, and the carrier parameters may be RSRP measurement values.

For example, supposing the UE has measured carrier 1, carrier 2, and carrier 3 of the neighboring cell, and the corresponding RSRP measurement values are −1 dB, −3 dB, and −5 dB respectively, the measurement report includes carrier 1, carrier 2, and carrier 3; and −1 dB, −3 dB, and −5 dB which are the RSRP measurement values corresponding to the carriers respectively.

In the seventh embodiment, the UE may obtain the measurement values of multiple carriers, and report the measurement parameters of the carriers and the corresponding carrier indications, thus reporting the measurement parameters of multiple carriers to the serving cell NodeB.

Embodiment 8

Figure 8:
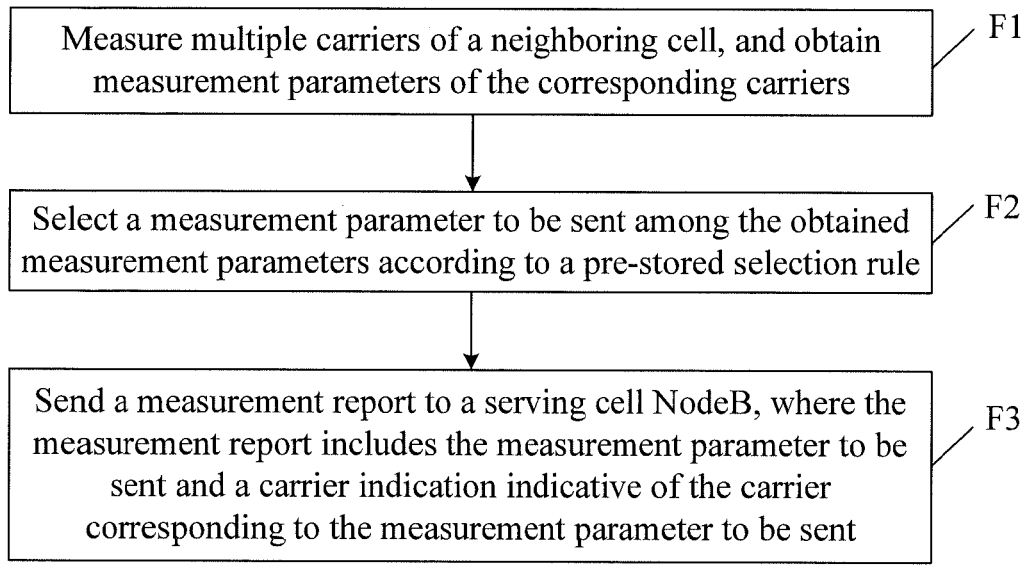
FIG. 8 is a flowchart of a method for submitting a measurement report according to an eighth embodiment of the present invention.

As shown in FIG. 8, a method for submitting a measurement report according to the eighth embodiment of the present invention includes the following steps:

F1. Measure multiple carriers of a neighboring cell, and obtain measurement parameters of the corresponding carriers.

F2. Select, according to a pre-stored selection rule, the measurement parameter to be sent among the obtained measurement parameters. The mode of selecting the measurement parameter to be sent among the obtained measurement parameters may be: selecting the maximum value as the measurement parameter to be sent among the obtained measurement parameters. The measurement parameter may be an RSRP measurement value.

F3. Send a measurement report to a serving cell NodeB, where the measurement report includes a neighboring cell ID, the measurement parameter to be sent, and a carrier indication indicating the carrier corresponding to the measurement parameter to be sent. Specifically, the measurement parameter to be sent may be the maximum value selected in step F2.

In this case, the measurement report includes a neighboring cell ID, the maximum value, and a carrier indication indicating the carrier corresponding to the maximum value. The carrier indication may be a carrier number.

In the example given in the preceding seventh embodiment, the maximum value in the RSRP measurement values is −1 dB, the corresponding carrier number is 1, and the measurement report includes: carrier 1 and −1 dB.

In the eighth embodiment, the UE may obtain the measurement parameters of multiple carriers, and report the maximum value of the measurement parameters of the carriers and the corresponding carrier indication so that the serving cell NodeB knows the carrier most severely affected by the UE in the neighboring cell.

Embodiment 9

Figure 9:
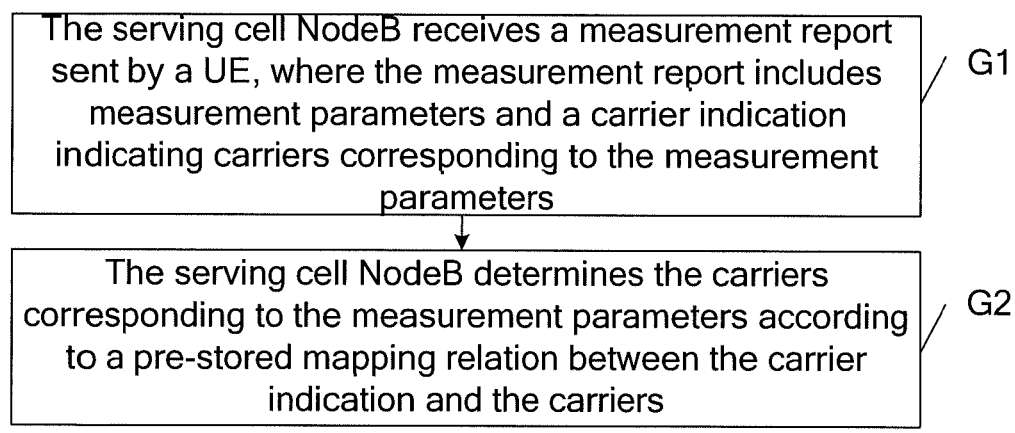
FIG. 9 is a flowchart of a method for receiving a measurement report according to a ninth embodiment of the present invention.

As shown in FIG. 9, a method for receiving a measurement report according to the ninth embodiment of the present invention includes the following steps:

G1. The serving cell NodeB receives a measurement report sent by a UE, where the measurement report includes measurement parameters and carrier indications indicating carriers corresponding to the measurement parameters.

The format of the received measurement report may be the format given in step E2 in the seventh embodiment or step F2 in the eighth embodiment, and is not further described.

G2. The serving cell NodeB determines the carriers corresponding to the measurement parameters according to a pre-stored mapping relation between the carrier indications and the carriers, so as to obtain the measurement parameters which are the results of the UE measuring the carriers.

Before step G2, the serving cell NodeB may receive carrier aggregation related information sent by the neighboring cell NodeB. The carrier aggregation related information includes a mapping relation between the carrier indications and the carriers. Additionally, the serving cell NodeB obtains the mapping relation between the carrier indications and the carriers from the carrier aggregation related information, and stores the mapping relation.

In the ninth embodiment, the serving cell NodeB determines, according to the mapping relation between the carrier indication and the carrier, the carriers corresponding to the measurement values reported by the UE in the multi-band system.

Embodiment 10

Figure 10:
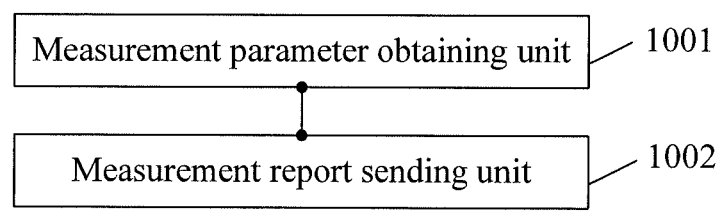
FIG. 10 is a structure diagram of a UE according to a tenth embodiment of the present invention.

As shown in FIG. 10, a UE provided in the tenth embodiment of the present invention includes:

a measurement parameter obtaining unit 1001, configured to measure multiple carriers of a neighboring cell, and obtain measurement parameters of the corresponding carriers; and a measurement report sending unit 1002, configured to send a measurement report to a serving cell NodeB, where the measurement report includes the obtained measurement parameters and carrier indications indicating carriers corresponding to the measurement parameters.

In the tenth embodiment, the measurement parameter obtaining unit of the UE may obtain the measurement values of multiple carriers, and the measurement report sending unit may report the measurement parameters of the carriers and the corresponding carrier indications. In this way, the measurement parameters of multiple carriers are reported to the serving cell NodeB.

Embodiment 11

Figure 11:
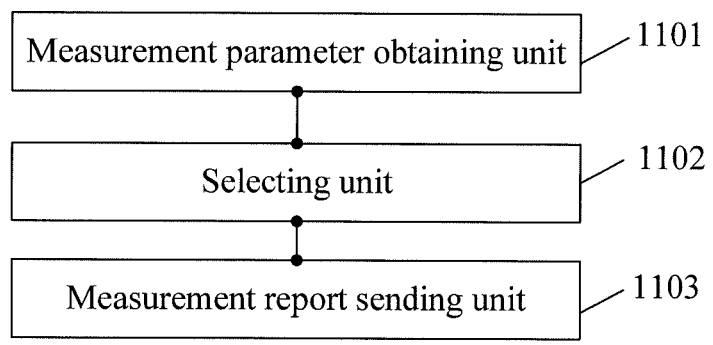
FIG. 11 is a structure diagram of a UE according to an eleventh embodiment of the present invention.

As shown in FIG. 11, a UE provided in the eleventh embodiment of the present invention includes:

a measurement parameter obtaining unit 1101, configured to measure multiple carriers of a neighboring cell, and obtain measurement parameters of the corresponding carriers;

a selecting unit 1102, configured to select, according to the pre-stored selection rule, the measurement parameter to be sent among the obtained measurement parameters, and specifically, select the maximum value as the measurement parameter to be sent among the obtained measurement parameters; and a measurement report sending unit 1103, configured to send a measurement report to a serving cell NodeB, where the measurement report includes the measurement parameter to be sent, and a carrier indication indicating the carrier corresponding to the measurement parameter to be sent.

It is understandable that the accompanying drawings or embodiments given herein are illustrative in nature, and representative of logical structures. The modules shown as standalone components may be physically separated or not, and the components shown as modules may be physical units or not, namely, they may be located on the same entity or distributed on several network entities.

The UE provided in this embodiment is configured to execute the foregoing method for submitting a measurement report.

In the eleventh embodiment, the measurement parameter obtaining unit of the UE may obtain the measurement parameters of multiple carriers, and the measurement report sending unit reports the maximum value of the measurement parameters of the carriers and the corresponding carrier indications so that the serving cell NodeB knows the carrier most severely affected by the UE in the neighboring cell.

Embodiment 12

Figure 12:
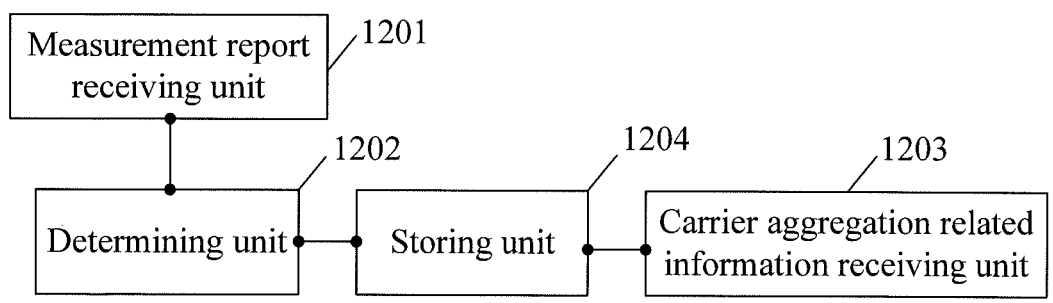
FIG. 12 is a structure diagram of a NodeB according to a twelfth embodiment of the present invention.

As shown in FIG. 12, a NodeB provided in the twelfth embodiment of the present invention includes:

a measurement report receiving unit 1201, configured to receive a measurement report sent by a UE, where the measurement report includes a measurement parameter and a carrier indication indicating a carrier corresponding to the measurement parameter; and a determining unit 1201, configured to determine the carrier corresponding to the measurement parameter according to a mapping relation between the carrier indication and the carrier.

The NodeB further includes:

a carrier aggregation related information receiving unit 1203, configured to receive the carrier aggregation related information sent by the neighboring cell NodeB, where the carrier aggregation related information includes a mapping relation between the carrier indication and the carrier; and a storing unit 1204, configured to obtain the mapping relation between the carrier indication and the carrier from the carrier aggregation related information, and store the mapping relation.

It is understandable that the accompanying drawings or embodiments given herein are illustrative in nature, and representative of logical structures. The modules shown as standalone components may be physically separated or not, and the components shown as modules may be physical units or not, namely, they may be located on the same entity or distributed on several network entities.

The UE provided in this embodiment is configured to execute the foregoing method for receiving a measurement report.

In the twelfth embodiment, the NodeB determines, according to the mapping relation between the carrier indications and the carriers, the carriers corresponding to the measurement values reported by the UE in the multi-band system.

Described above is a method for determining UE or UEs affecting a neighboring cell, a method for submitting a measurement report, a relevant system and equipment under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for receiving a measurement report, comprising:

receiving, by a serving cell NodeB, carrier aggregation related information sent by a neighboring cell NodeB, wherein the carrier aggregation related information including a mapping relation between a carrier indication and a carrier;

obtaining, by the serving cell NodeB, the mapping relation between the carrier indication and the carrier from the carrier aggregation related information;

receiving, by the serving cell NodeB, a measurement report sent by a User Equipment (UE), wherein the measurement report includes a measurement parameter and a carrier indication indicating a carrier corresponding to the measurement parameter; and determining, by the serving cell NodeB, the carrier corresponding to the measurement parameter according to the obtained mapping relation between the carrier indication and the carrier.

2. The method according to claim 1, further comprising: storing the mapping relation.

3. The method according to claim 1, wherein the measurement report includes a maximum value among measurement parameters obtained by the UE.

4. The method according to claim 1, wherein the maximum value is a Reference Signal Received Power (RSRP) measurement value.

5. A NodeB, comprising:

a carrier aggregation related information receiving unit, configured to receive carrier aggregation related information sent by a neighboring cell NodeB, wherein the carrier aggregation related information includes a mapping relation between a carrier indication and a carrier:

a measurement report receiving unit, configured to receive a measurement report sent by a User Equipment (UE), wherein the measurement report includes a measurement parameter and a carrier indication indicating a carrier corresponding to the measurement parameter; and a determining unit, configured to determine the carrier corresponding to the measurement parameter according to the received mapping relation between the carrier indication and the carrier.

6. The NodeB according to claim 5, further comprising: a storing unit, configured to obtain the mapping relation between the carrier indication and the carrier from the carrier aggregation related information, and store the mapping relation.

7. The NodeB according to claim 5, wherein the measurement report includes a maximum value among measurement parameters obtained by the UE.

8. The method according to claim 7, wherein the maximum value is a Reference Signal Received Power (RSRP) measurement value.

* * * * *

UNITED STATES PATENT AND TRADEMARK OFFICE
CERTIFICATE OF CORRECTION

PATENT NO. : 8,588,702 B2  
APPLICATION NO. : 13/101395  
DATED : November 19, 2013  
INVENTOR(S) : Dengkun Xiao et al.

Page 1 of 1

It is certified that error appears in the above-identified patent and that said Letters Patent is hereby corrected as shown below:

In the Claims

Column 16, Line 44, In Claim 5, delete "and a carrier:" and insert -- and a carrier; --, therefor.

Signed and Sealed this
Twenty-fourth Day of March, 2015

Michelle K. Lee
*Director of the United States Patent and Trademark Office*